ically, it relates to the chemistry of α-tocopherol.

United States Patent Office 3,173,927
Patented Mar. 16, 1965

3,173,927
α-TOCOPHEROL DIMER AND PROCESS FOR ITS PREPARATION
Donald R. Nelan, Rochester, N.Y., assignor to Eastman Kodak Company, Rochester, N.Y., a corporation of New Jersey
No Drawing. Filed Oct. 2, 1961, Ser. No. 142,023
11 Claims. (Cl. 260—345.5)

This invention relates to the chemical arts. More particularly, it relates to the chemistry of α-tocopherol.

α-Tocopherol is a well-known organic chemical. This compound has antioxidant activity and is the most highly active form of vitamin E. It has the formula:

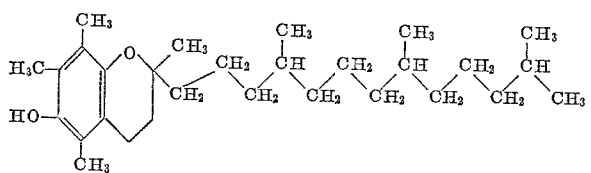

This formula is usually written for the sake of convenience:

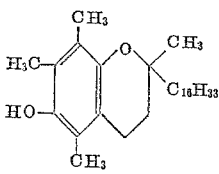

α-Tocopherol occurs naturally in many vegetable and animal fats and oils. Processes have been developed to separate α-tocopherol in substantially pure form from these sources. α-Tocopherol is also synthesized by a process involving the reaction of trimethyl hydroquinone with phytyl bromide. As a result α-tocopherol and certain carboxylic acid esters thereof have become readily available commercial products.

A major use of these products is in vitamin preparations primarily because of their vitamin E activity. Antioxidant use is limited to α-tocopherol inasmuch as α-tocopheryl esters have no significant antioxidant activity. While α-tocopherol is an effective antioxidant for fats and oils susceptible to oxidation, particularly vitamin A concentrates, the extent of antioxidant activity is not as great as other well-known and readily available antioxidants. Consequently, the demand for α-tocopherol for use as an antioxidant is small. Hence, there is a need for an α-tocopheryl compound of increased antioxidant activity, particularly in oxidation susceptible fats and oils, as compared to α-tocopherol.

An object of this invention is to meet this need.

More particularly, an object of this invention is to provide a derivative of α-tocopherol having greater antioxidant activity, especially for fats and oils, than α-tocopherol itself.

These and other objects are achieved by this invention which, in summary, comprises a dimeric derivative of α-tocopherol and a process for making it. In addition, this invention comprises stabilized, oxidation susceptible fats and oils containing this derivative as an antioxidant.

The dimeric derivative of α-tocopherol of this invention has the following Formula I:

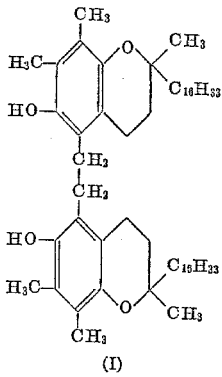
(I)

This compound, having the empirical formula $C_{58}H_{98}O_4$, has a theoretical molecular weight of 859.4. At normal room temperatures it is a light yellow oil. The infrared absorption spectra is similar to that of α-tocopherol. A typical ultraviolet absorption measurement in isooctane is $$E^{1\%}_{1\,cm.}(297\ m\mu)=87$$

The acetate of this compound, prepared by treating it with acetic anhydride-pyridine mixture, is a solid having a melting point 72–74° C. and has in ethanol a typical ultraviolet absorption spectrum of $$E^{1\%}_{1\,cm.}(278\ m\mu,\ 287\ m\mu)=44.3,\ 51.7$$

The diquinone of the dimer of Formula I is a solid having a melting point of 45–46° C. The α-tocopheryl dimer of Formula I has no vitamin E activity in the rat antisterility assay; however, it has antioxidant activity, especially in oxidation susceptible fats and oils. Consequently, it has utility as an antioxidant.

The process for making the α-tocopherol dimer of this invention comprises the steps of oxidizing α-tocopherol with a ferricyanide under aqueous alkaline conditions whereby an α-tocopheryl oxidation product is formed, and then reducing the oxidation product with a mild reducing agent, such as, for example, ascorbic acid.

The first step of this process, oxidizing α-tocopherol with a ferricyanide under aqueous alkaline conditions, is performed by admixing the reactants, whereby a two phase mixture results.

The ferricyanide employed in the first step of this process is any water soluble salt of ferricyanic acid containing the trivalent $\equiv[Fe(CN)_6]$ radical. Examples of such a salt are the alkali metal and alkali earth metal ferricyanides. A particularly effective and readily available ferricyanide is potassium ferricyanide.

The quantity of ferricyanide used in carrying out the first step is preferably at least about 2 molecular equivalents or moles for each mole of α-tocopherol. The only upper limit on ferricyanide concentration is one of practicality.

Aqueous alkaline conditions are obtained by employing a water solution of a water soluble base as a medium in which to admix the α-tocopherol and ferricyanide. The base preferably is any alkali metal or alkali earth metal hydroxide. Sodium hydroxide is especially useful. The concentration of the base in the water can vary within wide limits, the only important criterion being that the aqueous medium be alkaline. The water concentration can also vary within wide limits so long as there is sufficient water to dissolve the ferricyanide.

The result of the first step of the process of this invention is a two phase mixture with the oil phase containing oxidation product. Evidence points to the fact that the major component of the oxidation product is an α-tocopheryl dimer of the following chemical Formula II:

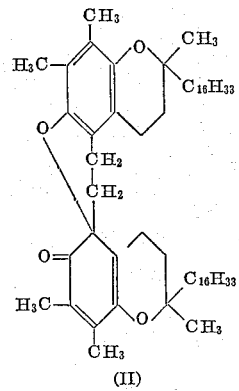

(II)

This compound upon isolation is a yellow oil having typical ultraviolet absorption spectra in isooctane of $$E_{1\,cm.}^{1\%}(300\ m\mu,\ 337\ m\mu) = 53.8,\ 22.1$$

The infrared spectra of this compound in ether shows bands at 5.97, 6.03 and 6.27μ (indicating the presence of a carbonyl group and of conjugated double bonds) and at 7.96, 9.13 and 10.36μ. Specific rotation of the compound of Formula II, when prepared from d-α-tocopherol, is $[\alpha]_D^{25} = +35°$. The theoretical molecular weight of this compound which has the empirical formula $C_{58}H_{96}O_4$ is 857.4.

Preferably the oil phase of the two phase mixture is separated from the water phase and purified prior to carrying out the second step of the process of this invention.

In passing it may be noted that Martius and Eilingsfeld, Ann., 607, 159 (1957), have reported the oxidation of α-tocopherol with alkaline potassium ferricyanide and the attempts made to characterize the composition of the oxidation product. However, Martius et al. do not report carrying out the second step of the process of this invention.

The second step of the process of this invention, reducing with a reducing agent the oxidation product formed in the first step, is performed by admixing the oxidation product with a mild reducing agent. A preferred reducing agent is ascorbic acid. However, other mild reducing agents such as one of the sulfhydryl compounds, for example: cysteine, can be used. The quantity of mild reducing agent present is preferably at least the molecular equivalent of the major component of the oxidation product. Preferably the admixing is carried out in a water-alcohol system for the purpose of obtaining good contact between the reactants. As a result of the admixing the α-tocopherol dimer of Formula II is converted to the α-tocopherol dimer of Formula I. Preferably, the α-tocopherol dimer of Formula I is separated from the reaction mixture and worked up to the extent desired for use as an antioxidant.

This invention is further illustrated by the following examples of various aspects thereof. This invention is not limited to the specific embodiments of the invention appearing in these examples unless otherwise indicated.

*Example 1*

This example illustrates the preparation of the α-tocopherol dimer of Formula I.

4.0 grams of d-α-tocopherol dissolved in 500 milliliters of petroleum ether (boiling point 30–60° C.) were shaken in a separatory funnel with a solution of 10 grams potassium ferricyanide in 100 milliliters of a 0.2 N sodium hydroxide solution. A two phase mixture resulted, one phase being a water solution and the other phase being a petroleum ether solution. The petroleum ether layer was separated, washed with water several times, dried over anhydrous sodium sulfate and the petroleum ether then removed. There resulted 4.2 grams of a yellow oil having ultraviolet absorption spectra in isooctane of $$E_{1\,cm.}^{1\%}(300\ m\mu,\ 337\ m\mu) = 43.6,\ 15.0$$

The yellow oil was chromatographed on a column of magnesium silicate (Florisil, 60–100 mesh U.S. screen size, Floridin Company). There resulted from this procedure 2.37 grams of purified oxidation product having ultraviolet absorptions in isooctane of $$E_{1\,cm.}^{1\%}(300\ m\mu,\ 337\ m\mu) = 53.8,\ 22.1$$

1.3 grams of the purified oxidation product were dissolved in 20 milliliters of ether. To this solution were admixed 160 milliliters of ethanol, 5 milliliters of water and 4 grams of ascorbic acid. The mixture was permitted to stand overnight at room temperature. 300 milliliters of petroleum ether were then admixed therewith, giving a two phase mixture, one phase being a water solution, the other phase being a petroleum ether solution. The resulting petroleum ether solution layer was removed, washed with water, dried over anhydrous sodium sulfate, filtered from the anhydrous sodium sulfate and evaporated to give a light yellow oil. This oil in isooctane had an ultraviolet absorption of $$E_{1\,cm.}^{1\%}(297\ m\mu) = 76.7$$

Purification of this oil by chromatography on a column of sodium aluminum silicate (Doucil, Philadelphia Quartz Company) gave 0.65 gram of an oil product fraction having in isooctane $$E_{1\,cm.}^{1\%}(297\ m\mu) = 87$$

The theoretical molecular weight calculated for the compound $C_{59}H_{98}O_4$ is 859.4. The molecular weight of the oil product found according to the cryoscopic method, involving benzene, described in Experimental Physical Chemistry by Daniels et al. was 785.

A portion of the oil product was admixed with acetic anhydride and pyridine to form an acetate ester. The acetate ester was a solid having a melting point of 72–74° C. In ethanol it had an ultraviolet absorption spectrum $$E_{1\,cm.}^{1\%}(278\ m\mu,\ 287\ m\mu) = 44.3,\ 51.7$$

The acetate ester of the α-tocopherol dimer of Formula I has the empirical formula $C_{62}H_{102}O_6$ with a calculated theoretical molecular weight of 943.5, a carbon atom concentration of 78.9 weight percent and a hydrogen atom concentration of 10.9 weight percent. It was found upon molecular weight determination by the aforementioned cryoscopic method, in benzene, that the acetic acid ester had a molecular weight of 972, a carbon content of 79.3 weight percent and a hydrogen content of 11.1 percent.

The infrared absorption spectrum of the oil product was very similar to that of α-tocopherol with a strong hydroxyl band (2.9μ) and none in the carbonyl region. When the spectrum was determined in carbon disulfide solution, there was a smaller shift in location of the hydroxyl band (to 2.85μ) than occurs with α-tocopherol (to 2.77μ).

Hence, the oil product was the α-tocopherol dimer of Formula I.

*Example 2*

This example illustrates the antioxidant activity of the α-tocopherol dimer of Formula I of this invention and a comparison of this antioxidant activity with the antioxidant activity of α-tocopherol.

Samples of vitamin A palmitate containing the dimeric α-tocopherol product of Formula I at three different concentrations (0.5, 1.0 and 2.0 weight percent) were prepared and compared in an accelerated stability test with samples of the same vitamin A palmitate containing α- tocopherol at the same concentrations (0.5, 1.0 and 2.0 weight percent) and also with a sample of the same vitamin A palmitate containing no antioxidant. The accelerated stability test involved weighing a drop of each sample on a strip of filter paper, storing the strips in an oven at 37° C. and assaying for the recovery of vitamin A after storage periods of 18 and 24 hours.

The results of these stability tests are summarized in the following table.

| Sample | Vitamin A Recovery (in Weight Percent) After— | |
|---|---|---|
| | 18 hrs. | 24 hrs. |
| Vitamin A Palmitate (Control) | 1 | |
| Vitamin A Palmitate +0.5 Wt. Percent α-Tocopherol | 1 | |
| Vitamin A Palmitate +1 Wt. Percent α-Tocopherol | 1 | |
| Vitamin A Palmitate +2 Wt. Percent α-Tocopherol | 1 | |
| Vitamin A Palmitate +0.5 Wt. Percent Dimer (I) | 5 | 1 |
| Vitamin A Palmitate +1 Wt. Percent Dimer (I) | 57 | 16 |
| Vitamin A Palmitate +2 Wt. Percent Dimer (I) | 80 | 21 |

Thus, the α-tocopheryl dimer of Formula I has much greater antioxidant activity than α-tocopherol relative to vitamin A palmitate.

Thus, there is provided a new antioxidant and a process for its preparation. A feature of advantage of this new antioxidant is its low volatility.

Other features, advantages and embodiments of this invention will occur to those in exercise of ordinary skill in the art upon reading the foregoing disclosure. All embodiments of this invention including variations and modifications embracing the spirit and essential characteristics of this invention are within the scope of the claimed subject matter unless specifically excluded by claim language.

I claim:

1. A composition of matter of the formula:

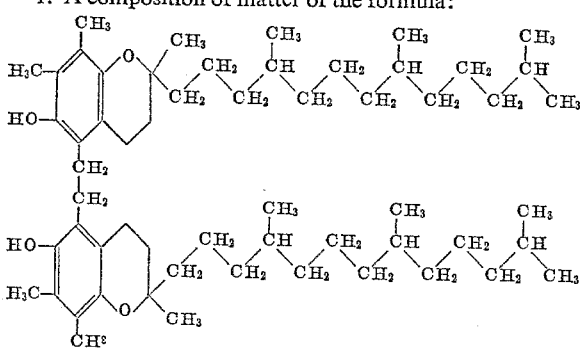

2. A process for preparing an α-tocopheryl dimer of the formula:

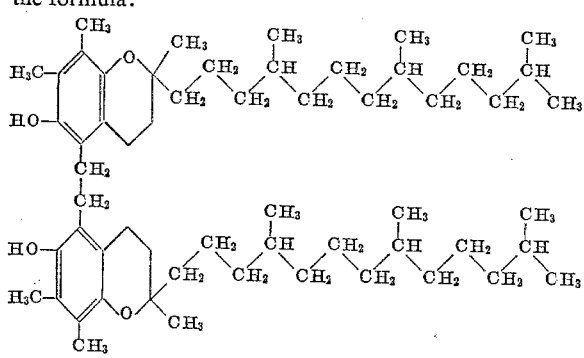

which comprises: oxidizing α-tocopherol with a water soluble ferricyanide salt whereby an oxidation product is formed; and reducing said oxidation product with a mild reducing agent selected from the group consisting of ascorbic acid and cysteine.

3. A process for preparing an α-tocopheryl dimer of the formula:

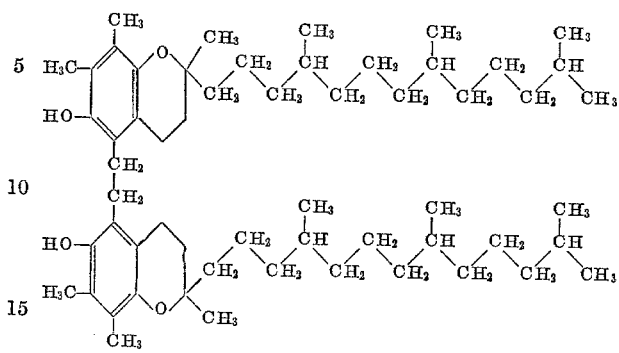

which comprises: oxidizing α-tocopherol with a water soluble ferricyanide salt by admixing the same under aqueous alkaline conditions whereby an oil-water mixture containing an oxidation product is formed; separating said oxidation product from said mixture; and reducing said oxidation product with a mild reducing agent selected from the group consisting of ascorbic acid and cysteine.

4. A process for preparing an α-tocopheryl dimer of the formula:

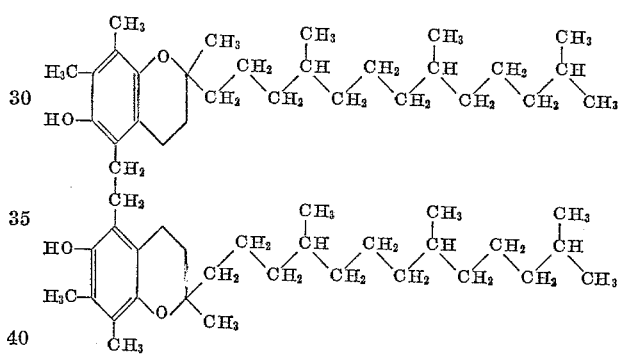

which comprises: oxidizing α-tocopherol with a water soluble ferricyanide salt by admixing the same under aqueous alkaline conditions whereby an oil-water mixture containing an oxidation product is formed; separating said oxidation product from said mixture; reducing said oxidation product with a mild reducing agent selected from the group consisting of ascorbic acid and cysteine by admixing said oxidation product with said reducing agent in water and ethanol, whereby a reaction mixture containing said dimer is formed; and separating said dimer from said reaction mixture.

5. A process for preparing an α-tocopheryl dimer of the formula:

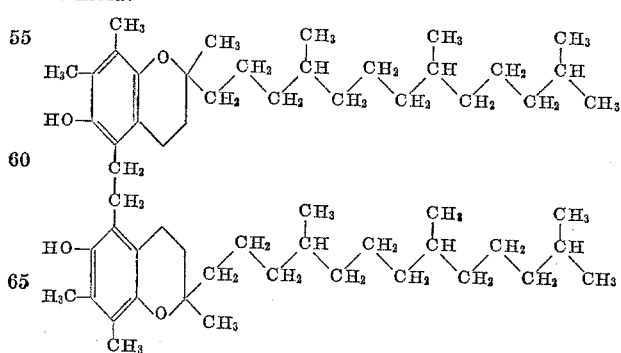

which comprises: oxidizing α-tocopherol with potassium ferricyanide by admixing the same under aqueous alkaline conditions whereby an oil-water mixture containing an oxidation product is formed; separating said oxidation product from said mixture; reducing said oxidation product with ascorbic acid by admixing said oxidation product with said ascorbic acid in water and ethanol, whereby a reaction mixture containing said dimer is formed; and separating said dimer from said reaction mixture.

6. A process for preparing an α-tocopherol dimer of the formula

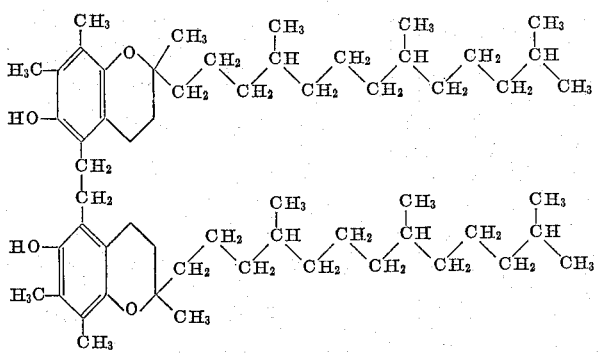

which comprises: contacting an α-tocopherol dimer of the formula

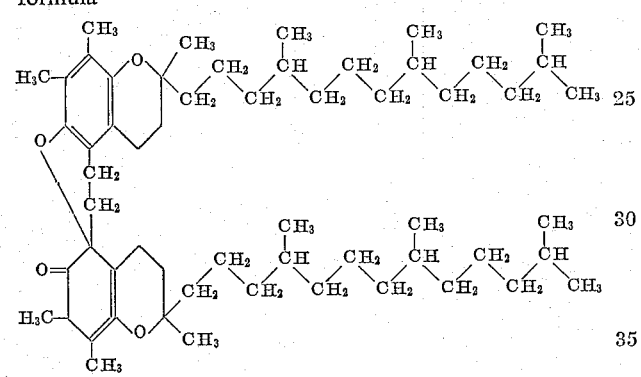

with a mild reducing agent selected from the group consisting of ascorbic acid and cysteine.

7. A process for preparing an α-tocopherol dimer of the formula

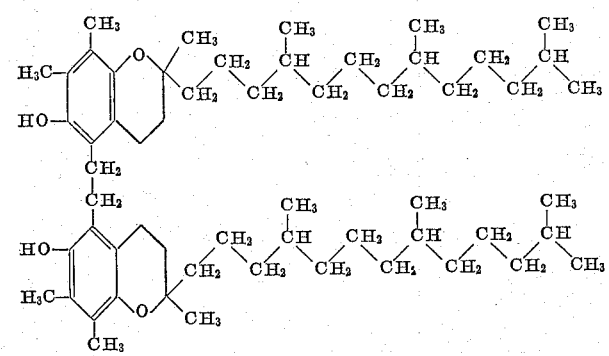

which comprises: admixing an α-tocopherol dimer of the formula

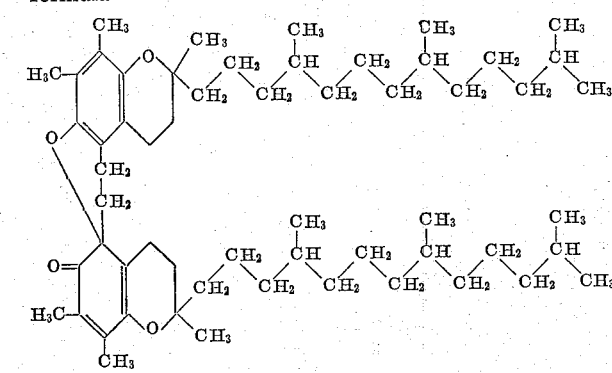

with a mild reducing agent selected from the group consisting of ascorbic acid and cysteine in water and ethanol, whereby a reaction mixture containing said dimer of the first formula is formed; and separating said dimer of the first formula from said reaction mixture.

8. A process for preparing an α-tocopherol dimer of the formula

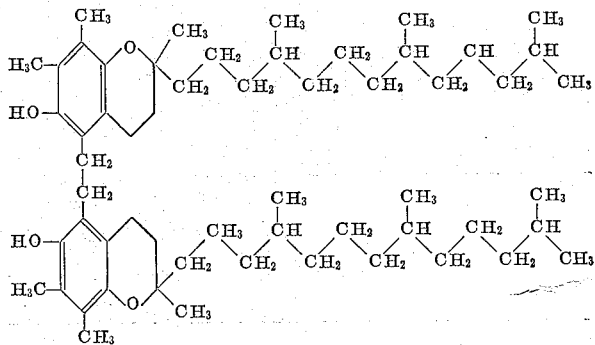

which comprises: admixing an α-tocopherol dimer of the formula

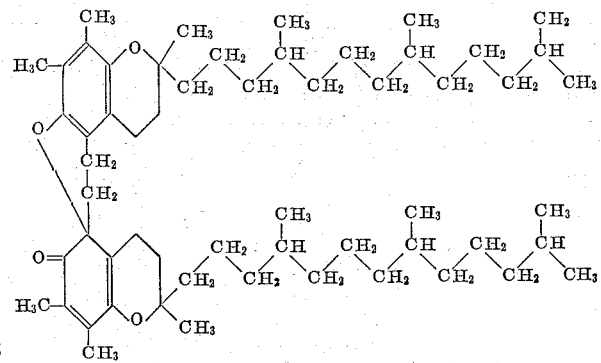

with ascorbic acid in water and ethanol, whereby a reaction mixture containing said dimer of the first formula is formed; and separating said dimer of the first formula from said reaction mixture.

9. Stabilized, oxidation susceptible fats and oils containing as an anti-oxidant an α-tocopheryl dimer of the formula:

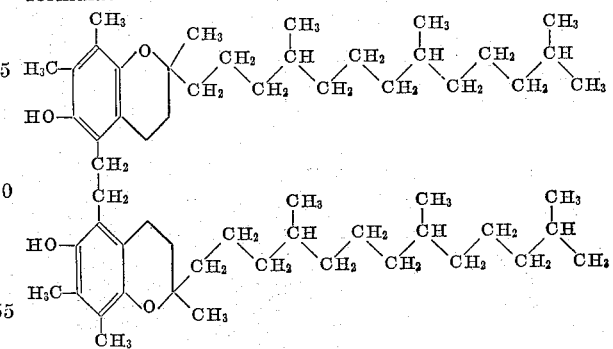

10. A stabilized, vitamin A composition consisting essentially of a vitamin A concentrate and as an antioxidant at a concentration of at least about 0.5 weight percent of the composition an α-tocopheryl dimer of the formula:

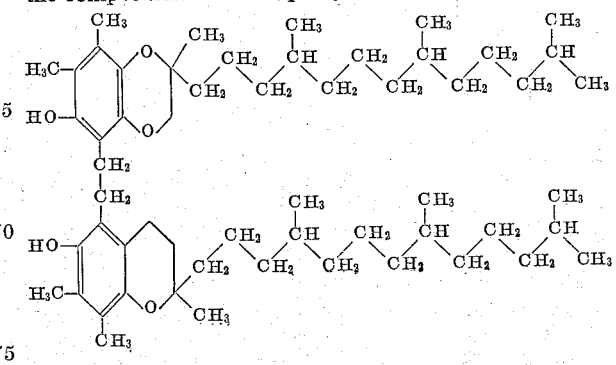

11. A stabilized vitamin A palmitate composition consisting essentially of vitamin A palmitate and as an antioxidant an α-tocopheryl dimer of the formula

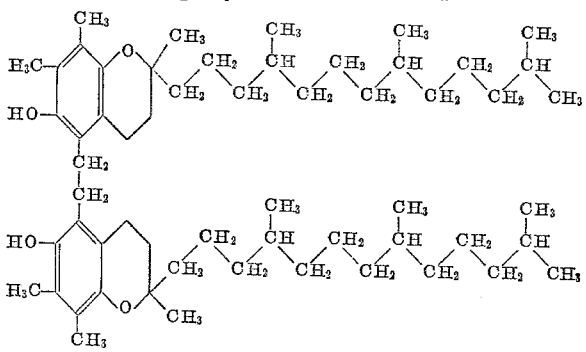

at a concentration of at least about 0.5 weight percent of the composition.

References Cited by the Examiner

UNITED STATES PATENTS

| | | | |
|---|---|---|---|
| 2,349,278 | 5/44 | Hickman | 99—163 X |
| 2,464,927 | 3/49 | Hall et al. | 99—163 X |
| 2,526,865 | 10/50 | Gyorgy | 99—163 X |
| 2,592,628 | 4/52 | Weisler | 345.5 |
| 2,639,288 | 5/53 | Bell et al. | 260—398.5 |
| 2,640,058 | 5/53 | Weisler | 260—345.5 |
| 2,645,648 | 7/53 | Evans et al. | 260—398.5 |
| 2,680,749 | 6/54 | Cawley et al. | 260—345.5 |

OTHER REFERENCES

Boyer: Journal American Chemical Society, vol. 73, pp. 733–740 (1951).

Issidorides: Journal American Chemical Society, vol. 73, pp. 5146–5148 (1951).

Martius et al.: Annalen der Chemie, vol. 607, pp. 159–168 (1957).

Nelan et al.: Journal American Chemical Society, vol. 84, pp. 2963–2965 (1962).

IRVING MARCUS, *Primary Examiner.*

NICHOLAS S. RIZZO, WALTER A. MODANCE,
*Examiners.*